(12) United States Patent
Tiebel et al.

(10) Patent No.: US 8,919,535 B2
(45) Date of Patent: Dec. 30, 2014

(54) SYSTEM AND METHOD FOR LOADING AND/OR UNLOADING TRAYS

(71) Applicants: Peter Tiebel, Bad Abbach (DE); Laura Eckert, Zeitlarn (DE); Helmut Schuesslburner, Straubing (DE)

(72) Inventors: Peter Tiebel, Bad Abbach (DE); Laura Eckert, Zeitlarn (DE); Helmut Schuesslburner, Straubing (DE)

(73) Assignee: Krones AG, Neutraubling (DE)

( * ) Notice: Subject to any disclaimer, the term of this patent is extended or adjusted under 35 U.S.C. 154(b) by 162 days.

(21) Appl. No.: 13/623,370

(22) Filed: Sep. 20, 2012

(65) Prior Publication Data

US 2013/0075230 A1    Mar. 28, 2013

(30) Foreign Application Priority Data

Sep. 23, 2011    (DE) .......................... 10 2011 083 257

(51) Int. Cl.
| | |
|---|---|
| B65G 47/34 | (2006.01) |
| B65G 65/00 | (2006.01) |
| B65G 15/42 | (2006.01) |
| B65G 47/76 | (2006.01) |

(52) U.S. Cl.
CPC ............... *B65G 65/00* (2013.01); *B65G 15/42* (2013.01); *B65G 47/766* (2013.01); *B65G 2207/46* (2013.01)
USPC ........................... 198/597; 198/599; 198/610

(58) Field of Classification Search
CPC ...... B65G 47/52; B65G 47/64; B65G 47/766; B65G 2207/46; B65B 25/046
USPC ............ 198/597, 599, 610, 607; 53/244, 247
See application file for complete search history.

(56) References Cited

U.S. PATENT DOCUMENTS

| | | | | |
|---|---|---|---|---|
| 3,297,129 | A * | 1/1967 | Lesch | 198/418.6 |
| 5,787,680 | A * | 8/1998 | Tisma et al. | 53/244 |
| 8,684,166 | B2 * | 4/2014 | Huff et al. | 198/617 |
| 2004/0191049 | A1 | 9/2004 | Winkler et al. | |
| 2009/0257860 | A1 | 10/2009 | Schafer | |
| 2011/0308918 | A1 | 12/2011 | Schwardt et al. | |

FOREIGN PATENT DOCUMENTS

| | | |
|---|---|---|
| DE | 4023290 C1 | 9/1991 |
| DE | 9211139 U1 | 10/1992 |
| DE | 4143282 C1 | 5/1993 |
| DE | 4102654 C2 | 3/1994 |
| DE | 10127778 A1 | 12/2002 |
| DE | 10313576 A1 | 10/2004 |
| DE | 102006039697 A1 | 3/2008 |
| DE | 102008055704 A1 | 5/2010 |
| EP | 0496992 A1 | 8/1992 |
| EP | 0583859 B1 | 2/1997 |
| FR | 2592018 A1 | 6/1987 |
| GB | 2263459 A | 7/1993 |

* cited by examiner

*Primary Examiner* — James R Bidwell
(74) *Attorney, Agent, or Firm* — Leydig, Voit & Mayer, Ltd.

(57) ABSTRACT

A system for loading and/or unloading trays includes a first conveyor configured to convey the trays in a direction of transport. A lowering device is configured to lower the trays from the first conveyor onto a strip conveyor. A lift-out device is configured to lift the trays from the strip conveyor onto a second conveyor. The strip conveyor includes strips disposed perpendicularly to an upper surface of the strip conveyor and the trays include slots configured to receive the strips such that the strips perpendicularly emerge into corresponding slots while a respective one of the trays is being lowered onto the strip conveyor by the lowering device and perpendicularly emerge from the corresponding slots while the respective one of the trays is being lifted from the strip conveyor by the lift-out device.

22 Claims, 4 Drawing Sheets

SYSTEM AND METHOD FOR LOADING AND/OR UNLOADING TRAYS

CROSS-REFERENCE TO PRIOR APPLICATION

Priority is claimed to German Patent Application No. DE 10 2011 083 257.2, filed on Sep. 23, 2011, the entire disclosure of which is hereby incorporated by reference herein.

FIELD

The invention relates to a system and a method for loading and/or unloading trays.

BACKGROUND

A known method for automatically loading moved trays is, e.g. loading a tray from above. The items may be loaded onto the tray top-down at an acute angle and in free fall. Owing to the drop height, the items are burdened with a load and, thus, the items might tip over. Furthermore, the angle of the discharge conveyor relative to the tray depends on the lengths of the items. Accordingly, it may be difficult to load items with large varying lengths by means of one and the same discharge conveyor.

The method and the system according to DE 10 2008 055 704 A1 relates to the unloading of trays loaded with items. To this end, the tray consists of a frame with circumferential raised rim and of a floor having at least one opening. Within said rim, a transport plate is provided on the floor. For unloading the tray, the frame will be lowered until the upper surface of the transport plate is on the same level with the circumferential raised rim so that the items can be pushed off the transport plate. To lower the tray frame easily, a lowering device comprising supporting elements which grasp through said at least one opening from below, which are movable in the direction of transportation, may comprise a second conveyor subsequent to a first delivery conveyor, the level thereof being lowered with regard to said delivery conveyor.

The transport plate serving as a support can be guided in a flexibly linked manner with the frame of the tray via pins or guides so as to prevent, due to such linkage, any horizontal movement/shift of the plate but to enable a vertical movement thereof perpendicular to the floor of the frame.

The groups of supporting elements may be preceded by stop elements for aligning the positions of the trays. The tray comes from the first delivery conveyor and hits a corresponding stop element in the transfer zone, so that said at least one opening of the respective tray or the frame thereof is in alignment with the subsequently following group of supporting elements.

DE 41 02 654 C2 describes a loading and unloading device for trough-shaped trays, the floors thereof being provided with slots. By means of a clock-controlled circulating chain, the loading and the unloading stations are linked to supporting webs which may be passed through slots of the tray floor and project beyond the side walls of the trays. Conveyor zones connect at both ends of said circulating chain, are driven synchronously with the circulating chain and extend laterally along the circulating chain with said supporting webs over a transfer zone where a vertical transfer movement takes place.

Due to the vertical transfer movement, the supporting webs are being moved upwards through the slots of the tray floor while the trays are entering the chain conveyor, thus lifting the items to be conveyed to a height beyond the rim edges of the trays so that they can be removed towards the sides.

In the loading station, the items are placed onto the supporting webs which will then be moved out again downwards through the tray slots so that the items are placed onto the trays.

Loading and unloading of the trays can be done while the chain is circulating by pushing the items, during loading, from the supporting webs towards the side or by pushing them, in the loading station, from the side onto the chain webs.

Furthermore, the chain circulation may repeatedly be stopped in a clock-controlled manner in the unloading station and, correspondingly, in the loading station in order to either remove or place the items from or onto the supporting webs which might be done, for instance, by means of a removing or positioning rake.

While the supporting webs are either entering or leaving, the vertical movement is also accompanied by a horizontal movement of the supports, i.e. turn in or turn out, which leads, with increasing web height and smaller radius of the chain conveyor guide in the entering or leaving zone, to increasingly larger tray slots and large slot or supporting web distances. An increasing distance between the supporting webs leads to instability while placing and transporting the items, especially in case of short items, and, beyond, to a more complex push-on and push-off process for the items, as a smaller number of supporting webs may result in a reduced supporting area and, thus, to increased friction and to an increased wear of the packing of the items. Likewise, the dynamics occurring during loading and unloading can be reduced and a continuous transport of the trays during loading and unloading even be prevented which will imply that the trays may have to be stopped.

Patent specification DE 41 43 282 C1 discloses the use of trays having floors provided with slot-shaped openings into which profile bodies of dimensions corresponding to said openings can either be vertically moved in or moved out from below.

Starting from the floor of the tray to the rim of the tray, the profile bodies form an upwards inclined transport surface, the angle between floor and transport surface being selected such that pushing-off of the item can be safely ensured. The profile bodies are brought in at one side by means of a lifting device to avoid that not the whole item on the tray will be lifted by said profile bodies but that only a partial lifting of the item takes place.

Aligning the tray to the transfer position is done via centering elements in the form of studs so as to enable a trouble-free entering of said profile bodies.

SUMMARY

In an embodiment, the present invention provides a system for at least one of loading trays with items and unloading the trays loaded with the items. A first conveyor is configured to convey the trays in a direction of transport. A lowering device is disposed subsequent to the first conveyor and is configured to convey the trays from the first conveyor to a strip conveyor disposed subsequent to the lowering device, a level of the strip conveyor being lower than a level of the first conveyor and the lowering device being configured to lower the trays onto the strip conveyor. A lift-out device is disposed subsequent to the strip conveyor and is configured to convey trays from the strip conveyor to a second conveyor disposed subsequent to the lift-out device, the level of the strip conveyor being lower than a level of the second conveyor and the lift-out device being configured to lift out the trays from the strip conveyor. The strip conveyor includes strips disposed perpendicularly to an upper surface of the strip conveyor and the trays include slots configured to receive the strips such that the strips perpendicularly emerge into corresponding slots while a respective one of the trays is being lowered onto the strip conveyor by the lowering device and perpendicularly emerge from the corresponding slots while the respective one of the trays is being lifted from the strip conveyor by the lift-out device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In the logistics processes relating to the distribution of items on their way to the customers, highly flexible commissioning systems are becoming more and more important, due to increasingly shorter order cycles of increasingly smaller order sizes as well as to an increasing variance of article dimensions and article shapes, thus contributing to the operational success of enterprises. Owing to the existing and increasing variance of article dimensions and article shapes, it is advantageous to transport the articles on trays. Automated loading and unloading processes for trays is a substantial component of systems using trays for transportation. Especially items tending to tilt due to their uneven floor conditions or to an unfavorable height-width-relationship should be manageable in a reliable manner. This means that, e.g. jerky movements with high accelerations are to be avoided and that continuous motion sequences are to be preferred and that items can be positioned onto trays or removed therefrom in a smooth transfer at an angle between items and tray that should be as flat as possible. Beyond that it is advantageous to have trays of different lengths that can be used in a system so that, for instance, a large article can be transported on a large tray and a small article can be transported on a shorter tray.

Furthermore, to enable a high throughput rate of such commissioning systems, loading and/or unloading as well as synchronizing of the tray and the conveyor technique should be done while the trays are being transported continuously. Synchronizing the tray and the conveyor technique should be as cost-effective and robust as possible and should ideally be solved mechanically without any additional control technology being required.

The invention, in an embodiment, provides a system for loading trays with items and/or for unloading trays loaded with items, the system comprising the following: a first conveyor for conveying trays, said trays being moved in a direction of transportation; a lowering device subsequent to said first conveyor, said lowering device being provided to transport trays from said first conveyor to a strip conveyor subsequent to the lowering device, the level of said strip conveyor being lowered with regard to the level of said first conveyor, and the lowering device being further provided to lower trays onto said strip conveyor; and a lift-out device subsequent to said strip conveyor, said lift-out device being provided to transport trays from said strip conveyor to a second conveyor subsequent to said lift-out device, the level of said strip conveyor being lowered with regard to the level of said second conveyor, and said lift-out device being further provided to lift out the trays from said strip conveyor.

To this end, the level of said first or said second conveyor can be regarded as the height of the conveying surface of the respective conveyor. For instance, the height can be measured starting from the floor of the factory hall where the system is located. Another reference for determining the height may also be used. The surface formed by the upper rims of the strips may also be regarded as the level of said strip conveyor. With the strips having an upper rim that is not horizontal, the level can be determined by that part of the strip that is most remote from the strip conveyor surface.

The trays include slots designed to receive strips of said strip conveyor therein. Preferably, the slots are continuously formed, i.e. they extend from the lower surface to the upper surface of the tray. Between said slots, webs or fins may be provided consisting of the material of the tray, thus ensuring tray stability so that items can be transported on the trays.

Lowering the tray onto the strip conveyor by means of the lowering device causes that the strips provided on the strip conveyor are arranged perpendicularly to an upper surface of said strip conveyor and emerge perpendicularly into the slots of the tray, and while lifting the tray from the strip conveyor by means of the lift-out device, the strips are arranged perpendicularly to the upper surface of the strip conveyor and emerge perpendicularly from the slots of the tray.

In order to support such perpendicular emerging of the strips either into or from the slots of a tray, the side faces of the slots may be arranged perpendicularly to the upper surface of the strip conveyor.

In the region where the strips are either emerging into the slots of the trays or lowering from the slots of the trays, the strips of the strip conveyor may be aligned in parallel so as to allow for a high strip density or for very small distances between the slots in the tray floor (apart from vibrations, there is no horizontal movement of the supporting areas of the strips relative to the strip conveyor transport speed, as the strip conveyor moves straightforward in the region of synchronizing the slots with the strips and of loading and/or unloading).

The first conveyor, the lowering device, the strip conveyor, the lift-out device and the second conveyor may be arranged in the direction of transport one after the other in such a manner that trays can be continuously transported by means of said elements.

In this connection, the term "subsequent" may imply, for instance, that the lowering device is arranged subsequent to the region of the first conveyor where the conveyor belt is bent downwards from the direction of transport so that a tray can be transmitted from the conveyor belt to the lowering device.

Likewise, a lift-out device may be arranged subsequent to the region of the second conveyor where the conveyor belt is bent upwards in the direction of transport.

The lowering device of the system may include a first inclined plane by means of which the tray can be lowered from said first conveyor onto the strip conveyor and wherein the lift-out device may include another inclined plane by means of which the tray can be lifted from said strip conveyor onto said second conveyor.

For instance, the inclined plane of the lowering device may be designed in such a manner that said one side where the tray moving in the direction of transport arrives first is on the level of said first conveyor or slightly below (e.g. 5 mm, 8 mm, or 10 mm) the level of said first conveyor. Hence follows that a tray transported by said first conveyor can be transmitted to the lowering device without any problems. If said one side were arranged slightly above the level of the first conveyor, the tray would collide with said side. If, however, said side were arranged well below the level of said first conveyor, the tray would be lowered to the lowering device via a step so that items placed on said tray might lose balance.

The inclined plane of the lift-out device may be designed such that the one side where a tray moving in the direction of transport leaves the lift-out device is on the level of said second conveyor or slightly above (e.g. 5 mm, 8 mm, or 10 mm) the level of said second conveyor. Hence follows that a tray transported by said lift-out device to said second conveyor can be transmitted easily and safely to said conveyor.

Making use of inclined planes helps the trays to overcome the level difference between said first conveyor and said strip conveyor and between said strip conveyor and said second conveyor. Advantageously, an inclined plane is designed such that items transported on said trays do not lose balance so as to ensure a safe transport of items.

The term "subsequent" may, e.g. also imply that the system elements (first conveyor, lowering device, strip conveyor, lift-out device, second conveyor) are arranged such that they can also be spatially arranged in the direction of transport either one above the other or one below the other. This is advantageous in the region of the lowering device and of the strip conveyor as well as in the region of the strip conveyor and of the lift-out device, as the strips of the strip conveyor here emerge either into or from the slots of the trays.

The level of the strip conveyor is generally below the level of said first and said second conveyors, as those strips to be emerged into the slots of the trays from below start from the strip conveyor. The levels of said first and said second conveyors may either be the same or differ from each other.

Across said first inclined plane (lowering device), the tray from the first conveyor is traveling to the strip conveyor, the strips arranged on said strip conveyor being emerged perpendicularly into the slots of the trays from below. When entirely emerged, the strips preferably project beyond an upper surface of the tray so that e.g. an item placed on said tray is lifted by said strips so that a distance occurs between item and tray surface.

The strip conveyor strips may be of rectangular shape so that a virtual plane which may run through the upper rims of the strip (those rims having the largest distance to the upper surface of the strip conveyor) extends horizontally. In order to make pushing items onto or from the strip easier and safer, a strip may also be designed such that it includes a chamfered edge at the upper rim in the direction for pushing items either onto or from the strip.

A chamfered edge may have an angle of 2°, 5° or 10° with regard to the upper surface of the strip conveyor; smaller, larger or intermediate angles also being conceivable. Such chamfered edge may extend over a quarter, a third, or half of the length of the upper strip edge; smaller, larger or intermediate lengths of said chamfered edge also being conceivable.

In addition, the rims of the above-mentioned strip embodiments may be provided with lateral roundings. To this end, roundings of rims where two narrow strip sides adjoin each other and/or of rims where one narrow side and one surface side adjoin each other may be provided. Such roundings may have the form of e.g. quadrants, a radius of the circle being conceivable in the form of a fifth, a quarter, or a third of the strip thickness. Larger, smaller or intermediate radii might also be conceivable.

Instead of using solid strips, strips may be used in which the narrow sides, the lateral roundings and the chamfered edges are solid, the surface sides, however, are not solid. Thus, the strips have a bow-shaped or arc-shaped cross-diameter. The surface sides may be of either honeycombed or grid-like structure including passages.

Via the second inclined plane (lift-out device), the tray with the strips being emerged into the slots thereof travels from the strip conveyor to the second conveyor, said tray, while moving along the second inclined plane, finding its way from the strip conveyor level to the level of the second conveyor so that lifting the tray from the strip conveyor causes the strips to be gradually moved out of the tray slots during transport. As soon as an item was lifted on the strip conveyor by means of the strips and, thus, a distance between item and tray could have been reached, the item will be lowered towards the tray surface by moving the strips from of the slots and gets into contact with the tray surface.

The first inclined plane and the second inclined plane may each include at least one slide rail, preferably said at least one slide rail each including driven and/or non-driven rollers.

Driven rollers may serve to also transport a tray on the inclined plane before a strip emerged into a slot so as to cause the strip conveyor to move the tray. Beyond, driven rollers can control the speed of transport of the tray on said inclined plane so that, for instance, unintended forces acting upon an item on the tray can be prohibited in case the tray might reach too much speed without being controlled.

Non-driven rollers may support smooth advancing of the tray.

Instead of said first inclined plane, the lowering device may comprise a first sectional flanged roller track by means of which the tray can be lowered from said first conveyor onto the strip conveyor, and instead of said second inclined plane, the lowering device may comprise a second sectional flanged roller track by means of which the tray can be lifted out from the strip conveyor onto the second conveyor.

A sectional flanged roller track may include a plurality of separately movable sections, each of said sections being movable in either upward or downward direction. Trays are advanced within the individual sections by means of flanged rollers. Advantageously, said flanged rollers are designed as lateral flanged rollers so that the tray floor merely rests on the tray rim; accordingly, the tray slots and, thus, also the strips may be of maximum length without interacting with the lateral flanged rollers in a disturbing manner.

It is also possible to make use of a first inclined plane and a second sectional flanged roller track or of a first sectional flanged roller track and a second inclined plane in this system.

The first sectional flanged roller track may include sections that can be lowered and lifted and/or the second sectional flanged roller track may include sections that can be lowered and lifted. The first and/or second sectional flanged roller tracks each may include one, two, three or more sections, the number of sections in said first and said second sectional flanged roller tracks either differing from each other or being of the same size.

In a basic position, the sections of said first sectional flanged roller track may be in a lifted state, i.e. the roller zone where a tray will lie on is on the level of the first conveyor (or, depending on the embodiment, e.g. 5 mm, 8 mm, or 10 mm below the level of said first conveyor).

When a tray is transported from the first conveyor to the first sectional flanged roller track, the sections of said first sectional flanged roller track may be lowered by lowering all or a plurality of the sections preferably simultaneously. As soon as the tray has moved over one of said sections (i.e. there is no tray available any longer on said section), said section may be returned to the basic position, i.e. from the lowered state to a lifted state. Thus, another tray may be placed onto the first sectional flanged roller track while another tray is still being transported through the sectional flanged roller track (on the remaining sections). Accordingly, a transport distance between two trays on said sectional flanged roller track may be smaller than the length of the tray.

Lowering the sections of the first sectional flanged roller track causes a tray to be taken to the level of the strip conveyor, and the strips may emerge into the tray slots from below.

By means of the strip conveyor, the trays can be moved to the second sectional flanged roller track, wherein all or a plurality of said sections of said second sectional flanged roller track being in the basic position are in a lowered state. When a tray is now being placed onto the second sectional flanged roller track, the sections of said second sectional flanged roller track may be lifted by lifting all or a plurality of sections preferably simultaneously. As soon as the tray has moved over one of said sections, said section may be returned to the basic position, i.e. from the lifted state to a lowered state.

Lifting the sections causes the strips to be moved out of the tray slots so as to enable the tray to be further conveyed by said second conveyor.

The system may further comprise a synchronizing element for synchronizing slots of a tray with the strips, said synchronizing element exerting an effect on a tray when a web of said tray hits a strip of the strip conveyor, the web being arranged between two strips.

The synchronizing element may comprise a braking element which includes a wipe-off brush or a spring-mounted pressure bar. Owing to mechanical influences, these embodiments act, for instance, on the sides or the webs of a tray so that less maintenance is required for the braking elements.

In another embodiment, the synchronizing element may comprise a braking element which includes either a belt or a friction wheel generating a braking effect via a rotary field magnet or a hysteresis element and being pressed down via a spring element. Contrary to the preceding embodiments of the braking element, here an electric influence also becomes effective apart from the mechanical influence.

In the event that a web hits a strip, the braking element generates a mechanical resistance that is larger than a frictional coefficient between the web and the strip, but is also so small that the tray can be conveyed over or across the braking element.

Owing to mechanically synchronizing the slots with the strips, the control requirements of the system can be kept as minor as possible, as the use of sensors and actuators which have to be controlled via a control loop can be kept at a minimum. However, a mechatronic solution with sensors and actuators for braking or accelerating the trays, or a conveyor technique may result in an effective and reasonably priced synchronization of the slots with the strips of the strip conveyor.

Moreover, the synchronizing element may comprise carriers attached to the strip conveyor, any further transport of a tray preferably being supported by such carriers; the carriers preferably being designed such that they project beyond the strips and are arranged on the strip conveyor at a distance which is larger than one tray length.

The system may further comprise an accompanying conveyor provided at the level of the strip conveyor, such accompanying conveyor being intended to transport items to be loaded onto trays and/or to receive items to be unloaded from trays.

Furthermore, the system may comprise a pushing-off/pushing-on element in the form of a mechanical guidance above the strip conveyor for unloading items onto the accompanying conveyor or for loading the tray with items from said accompanying conveyor, the mechanical guidance preferably being provided with little rollers for improved sliding friction or being actively driven; said pushing-off/pushing-on element preferably having an arc-shaped contour, zones of varying sliding friction, and/or active drives or preferably a drive roller provided at one end of said pushing-off/pushing-on element. Accordingly, a torque can be transmitted to the items in interaction with the accompanying conveyor so as to initiate and/or support rotation of the item.

The pushing-off/pushing-on element may be provided in the form of an element for unloading items onto the accompanying conveyor or for loading the tray with items from said accompanying conveyor, such element moving over the strip conveyor synchronously thereto.

The strips may comprise rounded edges with little static and sliding friction transversely to the direction of transport of the strip conveyor.

Preferably, trays are loaded and/or unloaded with the strip conveyor being continuously driven. Likewise, synchronizing the slots with the strips may also be done with the strip conveyor being continuously driven.

Furthermore, the invention, in an embodiment, provides a method for loading trays with items and/or for unloading trays loaded with items, the method comprising the following steps: transporting a tray by means of a first conveyor in a direction of transport; lowering the tray by means of a lowering device subsequent to said first conveyor onto a strip conveyor subsequent to said lowering device, the level of said strip conveyor being lowered with regard to the level of said first conveyor; transporting the tray by means of said strip conveyor to a lift-out device subsequent to said strip conveyor; lifting the tray from said strip conveyor by means of said lift-out device; transporting the tray to a second conveyor subsequent to said lift-out device, the level of said strip conveyor being lowered with regard to the level of said second conveyor; the trays including slots designed to receive strips of said strip conveyor therein, while lowering the tray onto the strip conveyor by means of said lowering device those strips arranged on said strip conveyor are perpendicularly arranged to an upper surface of said strip conveyor and perpendicularly emerge into the slots of the tray, and while lifting the tray from said strip conveyor by means of said lift-out device the strips are perpendicularly arranged to the upper surface of said strip conveyor and perpendicularly emerge from the slots of the tray.

In addition, the method may comprise synchronizing slots of a tray with the strips, wherein during such synchronization an effect is exerted on a tray when a web of the tray hits a strip of the strip conveyor, said web being provided between two strips.

Advantageously, the method further comprises loading a tray with an item, said item being transported by means of an accompanying conveyor which is on the level of said strip conveyor, said item being taken from said accompanying conveyor onto the strips of said strip conveyor by means of a pushing-off/pushing-on element, the strips being emerged into the slots of the tray, and/or unloading a tray loaded with an item, said item being taken from said strips of said strip conveyor onto said accompanying conveyor, the strips being emerged into the slots of the tray.

Figure 1A:
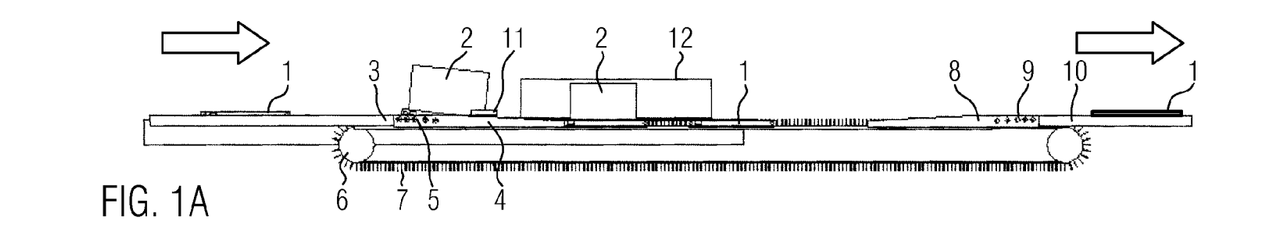
FIG. 1A is a side view of an embodiment of the system for loading and unloading trays with lowering and lift-out devices designed in the form of inclined planes.

FIG. 1A shows a first embodiment of the system for loading trays 1 with items 2 and/or for unloading trays 1 loaded with items 2. The system comprises a first conveyor 3, a lowering device 4 subsequent to said first conveyor 3, a strip conveyor 6 subsequent to the lowering device, a lift-out device 8 subsequent to strip conveyor 6, and a second conveyor 10 subsequent to lift-out device 8, the lowering device including a first inclined plane 4 by means of which tray 1 is lowered from first conveyor 3 onto strip conveyor 6, and said lift-out device including a second inclined plane 8 by means of which tray 1 is lifted from strip conveyor 6 onto second conveyor 10.

In addition, the system comprises an accompanying conveyor 13 for transporting items 2 to be placed onto a tray 1 or for receiving items 2 pushed off a tray 1. Loading or unloading of items 2 may be done by means of a pushing-off/pushing-on element 12.

Trays 1 can be transported on first conveyor 3 and on second conveyor 10 by means of consistent flanged rollers 14, in the transit zone between second inclined plane 8 and second conveyor 10 said consistent flanged rollers 14 being replaced by lateral flanged rollers 15 so as to enable that tray 1 is lowered onto strips 7 of strip conveyor 6 or that tray 1 is lifted from strips 7. The tray floor rests on consistent flanged rollers 14 while in case of lateral flanged rollers 15 it is just the tray rim that rests thereon.

Owing to said lateral flanged rollers 15, a free space 16 could be obtained for accommodating the deflection of the strip conveyor 6 therein. As trays 1 are conveyed by means of lateral flanged rollers 15, the slots 19 of the trays 1 and, thus, also the strips 7 may be of maximum length (also see FIG. 4). The slots may include a lead-in chamfer 20 (also see FIG. 3).

Via first inclined plane 4, trays 1 can be taken from the first conveyor 3 to the strip conveyor 6, the angle of the inclined plane 4 enabling slow transition from the higher level of the first conveyor 3 to the lower level of the strip conveyor 6. Thus, an undesired application of force on items 2 placed on the trays 1 can be avoided. The lowering speed of a tray 1 can also be controlled by means of said inclined plane 4. As shown, the first inclined plane 4 may include rollers 5 which are either driven and/or not driven.

Accordingly, a tray 1 can reach the strip conveyor 6 via the inclined plane 4, and the strips 7 can be inserted into the slots 19 of the tray 1 from below. The items 2 on the tray 1 are lifted by the strips 7 so that said items 2 are no longer in contact with the surface of the tray 1 but are supported by said strips 7, thus reducing the contact area of an item 2. Such reduction is due to the fact that the area of all longitudinal sides of the strips 7 is smaller than the upper surface of the tray 1 which they pass through.

Strip conveyor 6 may comprise a plate belt with attached strips, a module chain with strips or a rubber block chain, a chain, or a belt with attached strips. The strips 7 can be arranged either continuously or section-wise. Preferably, the strips 7 contain a plastic material with good sliding quality. The edges of the strips 7 may have roundings 25, and a chamfered edge 26 may also be provided for pushing items either onto or from the trays (also see FIG. 5).

In order to synchronize the slots 19 with the strips 7, a braking element 11 is provided in the area of first inclined plane 4. In the event that a web 21 hits a strip 7, a mechanical resistance will be generated by means of said braking element 11, which is greater than the friction value between the upper surface of the web 21 and the upper surface of the strip 7 but small enough to enable the tray 1 to be conveyed across the braking element 11.

When a strip 7 hits a web 21 of the tray 1, a friction value $RW_{LS}$ appears between the upper surface of the strip 7 and the upper surface of the web 21, which is smaller than the friction value $RW_{TB}$ appearing between an upper surface of the tray 1 and the upper surface of the braking element 11. Since $RW_{LS}$ is smaller than $RW_{TB}$, the braking element 11 can exert a braking effect on the tray 1. Such braking effect will remain until the strip 7 is emerged into a slot 19 of the tray 1. Thereafter, the tray 1 can be advanced by means of the strips 7 of the strip conveyor 6 emerged into said slots. Due to the advancing movement of the tray 1, it will be possible to overcome the braking effect of the braking element 11.

Figure 6A:
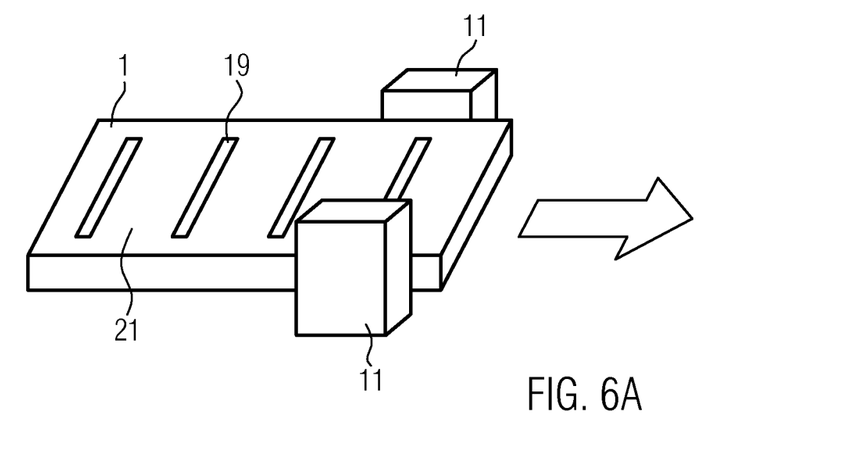
FIG. 6A shows a first embodiment of the braking element.
Figure 6B:
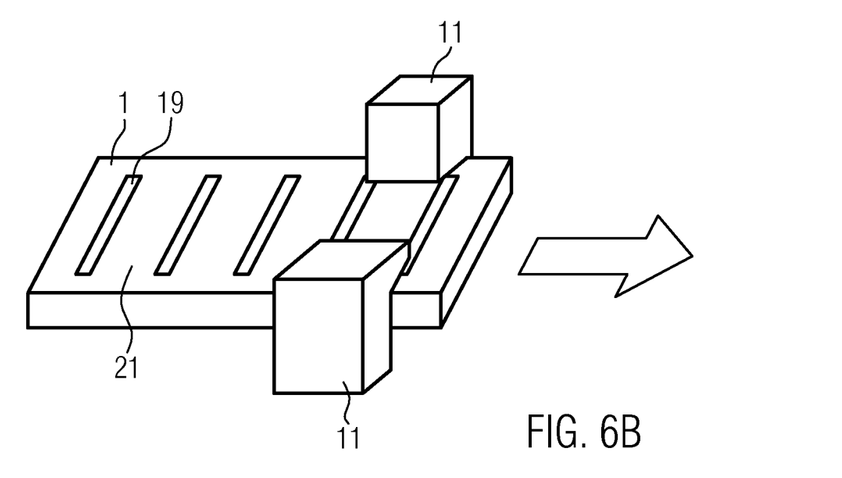
FIG. 6B shows another embodiment of the braking element.

To enable the braking element 11 to exert a braking effect on the tray 1, the braking element 11 can act laterally upon the tray (FIG. 6A) or can act laterally or e.g. from above upon the tray (FIG. 6B). Here, laterally means that when the tray 1 moves in a direction of transport the braking element 11 engages with those side faces of the tray running parallel to the direction of transport.

Figure 1B:
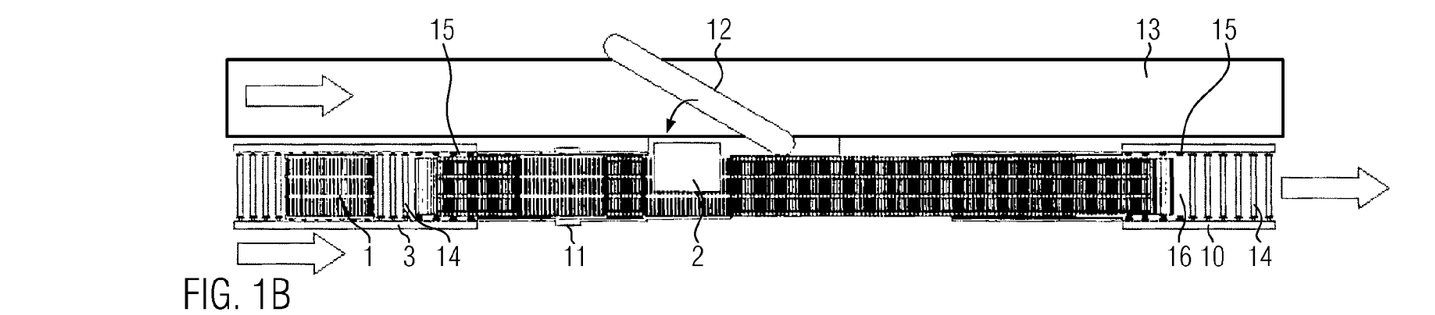
FIG. 1B is a plan view of the system of FIG. 1A while a tray is being loaded.
Figure 1C:
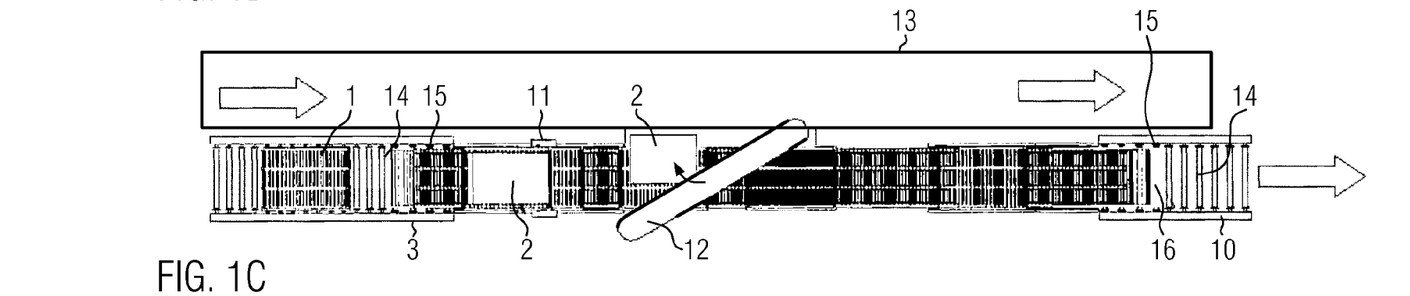
FIG. 1C is a plan view of the system of FIG. 1A while a tray is being unloaded.

While further proceeding, items 2 can be pushed from the strips 7 by means of a pushing-off/pushing-on element 12 and taken, e.g. onto a conveyor 13 running parallel to the strip conveyor 6 (see also FIG. 1C). From said conveyor 13, items 2 can also be pushed onto the strips 7 by means of said pushing-off/pushing-on element 12 (see also FIG. 1B).

After being loaded and/or unloaded, the tray 1 is transported by means of the strip conveyor 6 to the second inclined plane 8 over which the tray 1 glides onto second conveyor 10.

As shown, the first inclined plane 8 may include rollers 9 which are either driven and/or not driven.

FIG. 1B shows how a tray 1 is being loaded, wherein an item 2 is pushed from an accompanying conveyor 13 by means of the pushing-off/pushing-on element 12 onto the strips 7 passing through the tray 1, being positioned on the strip conveyor 6, via the slots 19.

FIG. 1C shows how a tray 1 is being unloaded by means of the pushing-off/pushing-on element 12, wherein an item 2 is pushed from the strips 7 passing through the tray 1 via slots 19, the tray 1 being positioned on the strip conveyor 6, onto the accompanying conveyor 13.

Pushing-off/pushing-on element 12 may include an upper surface with good gliding quality or a roller bar with small rollers so as to facilitate a relative movement of the item 2 transversely to the strips 7 and to enable gentle pushing-off and pushing-on movements with little force required transversely to the direction of pushing-off and pushing-on in either case. Pushing-off/pushing-on element 12 may include a belt deflector, a roller or glide bar, a pusher or a rotary pusher.

Figure 2:
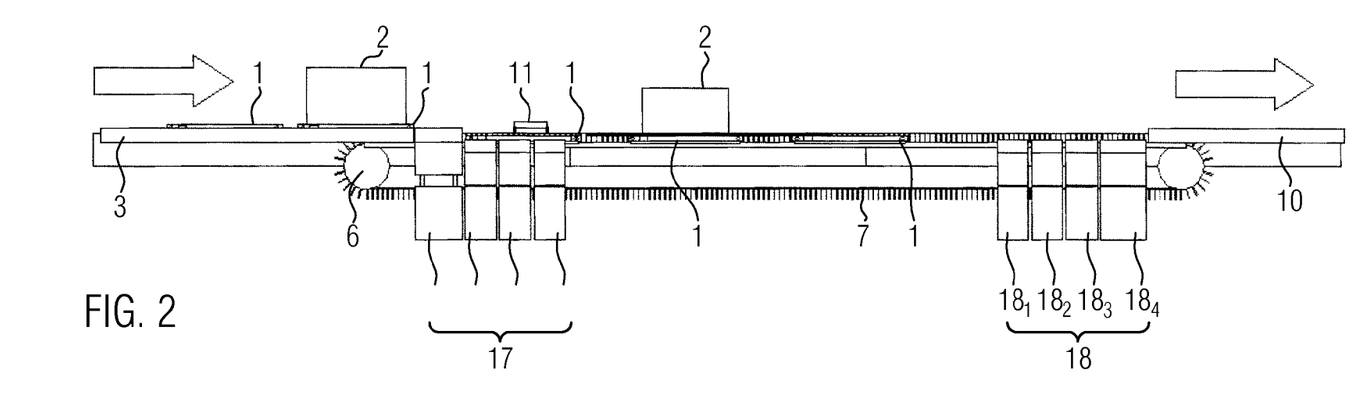
FIG. 2 is a side view of the system for loading and unloading trays with lowering and lift-out devices designed in the form of a sectional flanged roller track.

FIG. 2 shows a second embodiment of the system for loading trays 1 with items 2 and for unloading trays 1 loaded with items 2. The system comprises a first conveyor 3, a lowering device 4 subsequent to said first conveyor 3, a strip conveyor 6 subsequent to the lowering device, a lift-out device 8 subsequent to the strip conveyor 6, and a second conveyor 10 subsequent to the lift-out device 8, the lowering device including a first sectional flanged roller track 17 by means of which the tray 1 is lowered from the first conveyor 3 onto the strip conveyor 6, and wherein said lift-out device includes a second sectional flanged roller track 18 by means of which the tray 1 is lifted from the strip conveyor 6 onto the second conveyor 10.

In the drawing, the first sectional flanged roller track 17 includes four sections $17_1$, $17_2$, $17_3$, $17_4$ that can be lowered and lifted. The second sectional flanged roller track 18 also includes four sections $18_1$, $18_2$, $18_3$, $18_4$ that can be lowered and lifted. Said first and/or second sectional flanged roller tracks 17, 18 may include more than four or less than four sections, and the number of sections in said first and said second sectional flanged roller tracks has not necessarily to be one and the same.

In a basic position, the four sections $17_1$, $17_2$, $17_3$, $17_4$ of said first sectional flanged roller track 17 are in a lifted state. When a tray 1 is taken to said first sectional flanged roller track 17, the sections $17_1$, $17_2$, $17_3$, $17_4$ of said first sectional flanged roller track 17 are lowered by lowering preferably all of said four sections $17_1$, $17_2$, $17_3$, $17_4$ simultaneously. When the tray 1 has moved over one of said sections $17_1$, $17_2$, $17_3$, $17_4$, said corresponding section $17_1$, $17_2$, $17_3$, $17_4$ will again be returned into the basic position, i.e. it will be taken from the lowered state into the lifted state. Accordingly, another tray 1 can be taken onto said first sectional flanged roller track 17 while the other tray 1 is still being transported through said sectional flanged roller track 17. Hence follows that the transport distance between two trays 1 on said sectional flanged roller track 17 may be smaller than the tray length.

Owing to the lowering of the sections $17_1$, $17_2$, $17_3$, $17_4$ of said first sectional flanged roller track 17, a tray 1 is taken to the level of strip conveyor 6, and the strips 7 can emerge into the slots 19 of the tray 1 from below. To synchronize the slots 19 with the strips 7, a braking element 11 is provided in the area of the first inclined plane 4. In the event that a web 21 hits a strip 7, the braking element 11 generates a mechanical resistance that is larger than the friction value between the upper surface of the web 21 and the upper surface of the strip 7, but also so small that the tray 1 can be conveyed over the braking element 11. Due to such synchronization, the strips 7 of the strip conveyor 6 can be introduced into the slots 19 of the tray 1 and the tray 1 may, for instance, not lie on the strips 7.

When items 2 are positioned on a tray 1 they can be lifted by the strips 7 and taken, as described in FIG. 1C, from the strips 7 e.g. onto an accompanying conveyor 13 running parallel to the strip conveyor 6 by means of a pushing-off/pushing-on element 12. When a tray 1 is to be loaded, said pushing-off/pushing-on element 12 can be used to bring one or several items from said accompanying conveyor 13 running parallel to the strip conveyor 6 onto the strips 7 passing through the slots 19 of said tray, as described in FIG. 1B.

The tray 1, with or without items 2, is moved to said second sectional flanged roller track 18 by means of the strip conveyor 6, with the four sections $18_1$, $18_2$, $18_3$, $18_4$ being lowered so as to be in the basic position. When a tray 1 is taken onto the second sectional flanged roller track 18, the sections $18_1$, $18_2$, $18_3$, $18_4$ thereof will be lifted by lowering preferably all of said four sections $18_1$, $18_2$, $18_3$, $18_4$ simultaneously. When a tray 1 has moved over one of said sections $18_1$, $18_2$, $18_3$, $18_4$, the corresponding section $18_1$, $18_2$, $18_3$, $18_4$ will be returned into the basic position, i.e. it will be taken from the lifted state into a lowered state.

Owing to the lifting of the sections $18_1$, $18_2$, $18_3$, $18_4$, the strips 7 are moved out of the slots 19 of the tray 1. When items 2 are positioned on the strips 7 they will now be placed on the tray 1. Thus, the contact area is larger, and items 2 can be conveyed on the tray 1 even over larger distances in a safer manner, i.e. without slipping, for instance. The tray 1 can then be carried on by means of the second conveyor 10.

Figure 3:
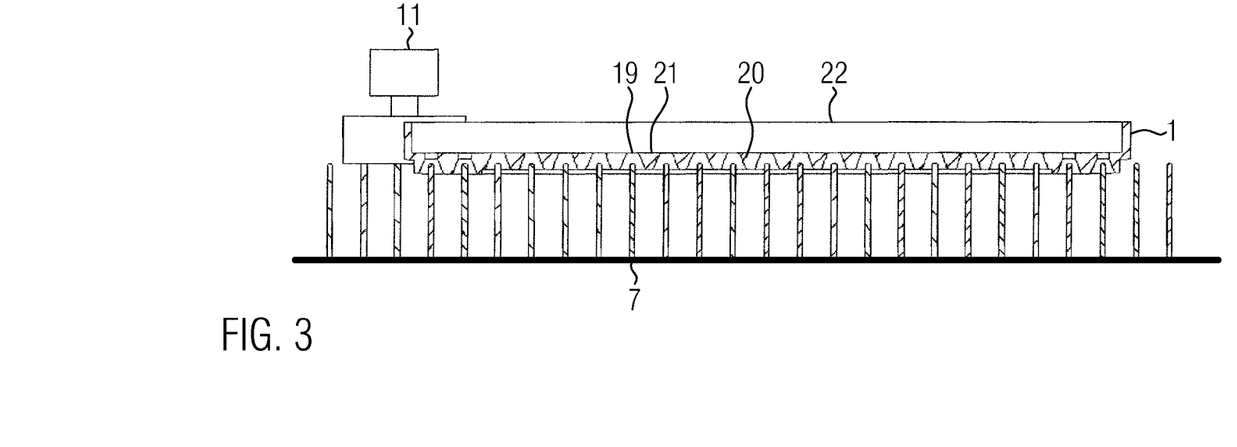
FIG. 3 is a cross-sectional view of a tray with slots and strips of the strip conveyor.

FIG. 3 is a sectional view of a tray 1 with slots 19. The slots 19 include lead-in chamfers 20 designed in a manner that they are narrower towards the surface of tray 1 onto which articles 2 will be placed than towards the surface of the tray 1 which will be placed onto strip conveyor 6.

The strips 7 are of a height dimensioned in a manner that they extend beyond an upper surface where the items are placed or beyond a rim of the tray 1 after being emerged into the slots 19. It is, thus, ensured that items 2 are no longer in contact with the upper surface of the tray 1 but are supported by the strips 7, thereby reducing a contact area of an item 2. Such reduction is achieved in that all of the longitudinal sides of the strips 7 have a smaller area than the upper surface of the tray 1 through which they pass.

When the tray 1 has a rim extending beyond the surface where items 2 are positioned, the strips 7 preferably are of such a length that they, when being entered into the slots 19, lift the items 2 to at least above the rim, thus enabling that the items 2 can be pushed off. To push items 2 onto the strips 7, same should at least reach above the rim of the tray 1.

Figure 4:
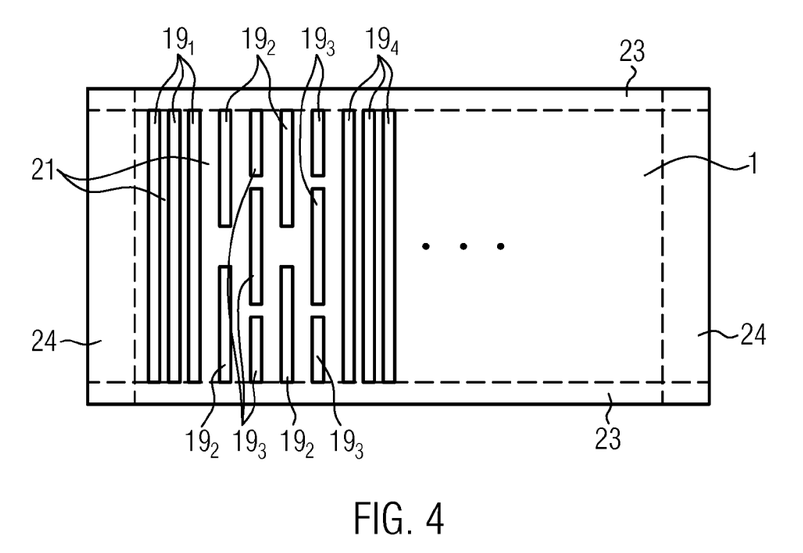
FIG. 4 is a plan view of a tray with slots.

FIG. 4 is a plan view of a tray 1 including various forms of slots 19, $19_1$, $19_2$, $19_3$, said slots 19, $19_1$, $19_2$, $19_3$ being separated from each other by webs 21. Said webs 21 consist of the same material as the tray 1 and are required to give the tray 1 sufficient stability and for transporting items 2 without being deformed which might hamper transportation.

In zones 24 of the tray 1 that are, while being transported on a conveyor in the direction of transport, either ahead or astern, preferably no slots 19, $19_1$, $19_2$, $19_3$ should be provided, said zone 24 being supposed not to be broader than a web 21 so as to enable the tray 1 to be lowered onto the strip conveyor 6.

In the lateral zones 23 of the tray 1 that are parallel to a direction of transport, there should also no slots be provided, since here flanged rollers 15 can act upon the tray 1 to ensure that the tray 1 is being transported. Beyond, even in case slots 19, $19_1$, $19_2$, $19_3$ had been provided, it would not be possible to insert any strips, as they would collide with the flanged rollers 15 during transport of the tray 1 and, thus, hamper transportation.

Tray 1 shown in FIG. 4 includes six slots $19_1$ extending outside lateral zones 23 of the tray 1 over the entire width of the tray. It has, thus, become possible to emerge strips 7 into the slots $19_1$, thus supporting an item 2 over a large area. However, in order to ensure sufficient stability of the tray 1 despite the slots 19, $19_1$, $19_2$, $19_3$, it is advantageous also to have slots 19, $19_1$, $19_2$, $19_3$ that are not extending over the entire width of the tray 1 so as to avoid, for instance, sagging of tray 1 when an item 2 is placed thereon through webs 21 provided between the slots 19, $19_1$, $19_2$, $19_3$. The slots $19_2$, $19_3$ extend merely over a part of the width of the tray 1 so that the area occupied by the webs 21 is larger than the area occupied by the webs between slots $19_1$ extending over the entire width of the tray 1. In the event of a tray 1 with webs 21 being offset or slots 19 being offset, synchronization might preferably be done not by means of a braking element 11 that exerts a braking effect on the tray 1 but, instead, by carriers.

Figure 5:
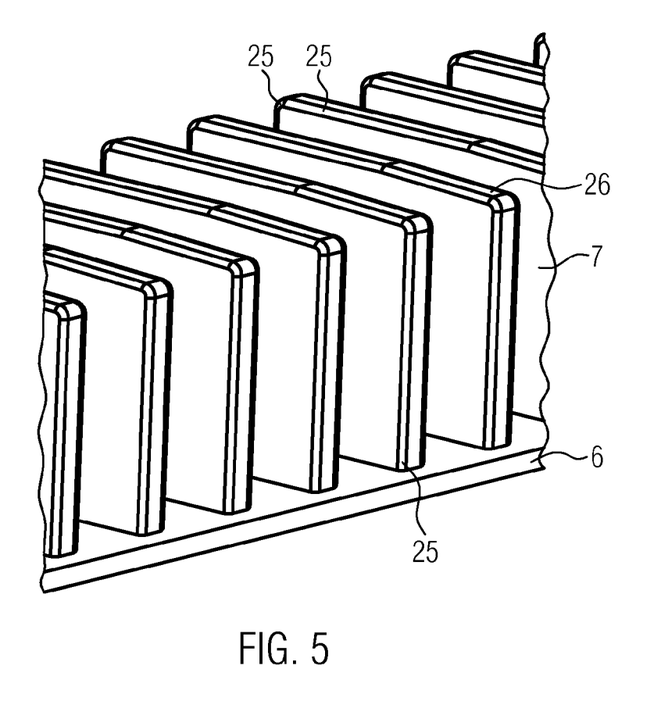
FIG. 5 shows strips of the strip conveyor.

FIG. 5 exemplarily shows three strips 7 of a strip conveyor 6. At one of their longitudinal sides, the strips 7 are connected with the strip conveyor 6 and project away, in the case as shown, perpendicularly from the upper surface of the strip conveyor 6. The other longitudinal side which is not connected with the strip conveyor 6 and, while emerging the strip 7 into a slot 19, 19₁, 19₂, 19₃ of a tray 1, hits said slot 19, 19₁, 19₂, 19₃ first, is provided with a rounding 25 enabling easier emerging into the slot 19, 19₁, 19₂, 19₃. Furthermore, the roundings 25 provided at the edges of the strips 7 serve to reduce, while loading or unloading an item 2, the friction between item 2 and strip 7, thus, however, still ensuring sufficient support by means of the strip 7. Moreover, the strips 7 may include, as shown, a chamfered edge 26 provided at the upper rims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise

What is claimed is:

1. A system for at least one of loading trays with items and unloading the trays loaded with the items, the system comprising:
    a first conveyor configured to convey the trays in a direction of transport;
    a lowering device disposed subsequent to the first conveyor and configured to convey the trays from the first conveyor to a strip conveyor disposed subsequent to the lowering device, a level of the strip conveyor being lower than a level of the first conveyor and the lowering device being configured to lower the trays onto the strip conveyor; and
    a lift-out device disposed subsequent to the strip conveyor and configured to convey trays from the strip conveyor to a second conveyor disposed subsequent to the lift-out device, the level of the strip conveyor being lower than a level of the second conveyor and the lift-out device being configured to lift out the trays from the strip conveyor,
    wherein the strip conveyor includes strips disposed perpendicularly to an upper surface of the strip conveyor and the trays include slots configured to receive the strips such that the strips perpendicularly emerge into corresponding slots while a respective one of the trays is being lowered onto the strip conveyor by the lowering device and perpendicularly emerge from the corresponding slots while the respective one of the trays is being lifted from the strip conveyor by the lift-out device.

2. The system according to claim 1, wherein the respective one of the trays includes a web configured to be disposed between two of the strips and wherein the system further comprises a synchronizing element configured to synchronize the slots of the respective one of the trays with the strips of the strip conveyor and to provide an effect on the respective one of the trays when the web hits one of the strips.

3. The system according to claim 2, wherein the synchronizing element includes a braking element provided with a wipe-off brush or a spring-mounted pressing bar.

4. The system according to claim 2, wherein the synchronizing element includes a braking element provided with a belt or a friction wheel and configured to be pressed on via a spring member and to produce a braking effect via a rotary field magnet or a hysteresis element.

5. The system according to claim 2, wherein the synchronizing element includes carriers disposed at the strip conveyor.

6. The system according to claim 5, wherein the carriers are disposed on the strip conveyor at a distance larger than a tray length and project beyond the strips, the carriers being configured to support continued transport of the respective one of the trays.

7. The system according to claim 1, wherein the lowering device includes a first inclined plane configured to lower the respective one of the trays from the first conveyor onto the strip conveyor, and wherein the lift-out device includes a second inclined plane configured to lift the respective one of the trays from the strip conveyor onto the second conveyor.

8. The system according to claim 7, wherein the first inclined plane and the second inclined plane each include at least one slide rail having at least one of driven rollers and un-driven rollers.

9. The system according to claim 1, wherein the lowering device includes a first sectional flanged roller track configured to lower the respective one of the trays from the first conveyor onto the strip conveyor, and wherein the lift-out device includes a second sectional flanged roller track configured to lift the respective one of the trays from the strip conveyor onto the second conveyor.

10. The system according to claim 9, wherein at least one of the first sectional flanged roller track and the second sectional flanged roller track includes sections that are configured to be lowered and lifted.

11. The system according to claim 10, wherein the first sectional flanged roller track includes the sections, a plurality or all of the sections being configured to be lowered simultaneously.

12. The system according to claim 10, wherein the second sectional flanged roller track includes the sections, a plurality or all of the sections being configured to be lifted simultaneously.

13. The system according to claim 1, wherein the system further comprises an accompanying conveyor, a level of the accompanying conveyor being the same as the level of the strip conveyor, the accompanying conveyor being configured to at least one of convey the items to be loaded onto the trays and receive the items to be unloaded from the trays.

14. The system according to claim 13, wherein the system further comprises a pushing-off/pushing-on element configured to provide a mechanical guidance over the strip conveyor and configured to at least one of unload the items onto the accompanying conveyor and load the respective one of the trays with the items from the accompanying conveyor.

15. The system according to claim 14, wherein the pushing-off/pushing-on element includes at least one of a curved contour, zones of varying sliding friction, active drives and a drive roll at one end of a deflector, the mechanical guidance being provided by rollers that are actively driven or disposed to provide an improved sliding friction.

16. The system according to claim 14, wherein the pushing-off/pushing-on element is configured as a pusher moving over the strip conveyor synchronously to the strip conveyor so as to at least one of unload the items onto the accompanying conveyor and load the respective one of the trays with the items from the accompanying conveyor.

17. The system according to claim 1, wherein the strips have rounded edges of minor static and sliding friction transversely to the direction of transport of the strip conveyor.

18. The system according to claim 1, wherein the strip conveyor is configured to be continuously driven during the at least one of the loading and the unloading.

19. The system according to claim 2, the strip conveyor is configured to be continuously driven during the synchronizing.

20. A method for at least one of loading trays with items and unloading the trays loaded with the items, the method comprising:
   transporting a respective one of the trays in a direction of transport using a first conveyor;
   lowering the respective one of the trays using a lowering device disposed subsequent to the first conveyor onto a strip conveyor that includes strips disposed perpendicularly to an upper surface of the strip conveyor, a level of the strip conveyor being lower than a level of the first conveyor, the strips perpendicularly emerging into corresponding slots disposed on the respective one of the trays during the lowering;
   transporting the respective one of the trays using the strip conveyor to a lift-out device disposed subsequent to the strip conveyor;
   lifting the respective one of the trays from the strip conveyor using the lift-out device, the strips perpendicularly emerging from the corresponding slots during the lifting; and
   transporting the respective one of the trays to a second conveyor disposed subsequent to the lift-out device, the level of the strip conveyor being lower than a level of the second conveyor.

21. The method according to claim 20, wherein the respective one of the trays includes a web configured to be disposed between two of the strips and wherein the method further comprises synchronizing the slots of the respective one of the trays with the strips of the strip conveyor so as to provide an effect on the respective one of the trays when the web hits one of the strips.

22. The method according to claim 20, wherein the method further comprises at least one of:
   loading the respective one of the trays with a respective one of the items that is conveyed using an accompanying conveyor which is on the level of the strip conveyor, wherein the respective one of the items is taken from the accompanying conveyor and positioned onto the strips of the strip conveyor using a pushing-off/pushing-on element such that the strips emerge into the slots of the respective one of the trays; and
   unloading the respective one of the trays loaded with the respective one of the items, wherein the respective one of the items is taken from the strips of the strip conveyor which are inserted into the slots of the respective one of the trays onto the accompanying conveyor using the pushing-off/pushing-on element.

\* \* \* \* \*